United States Patent [19]
Ito et al.

[11] Patent Number: 5,645,918
[45] Date of Patent: Jul. 8, 1997

[54] MAGNETIC RECORDING MEDIUM HAVING AN AROMATIC POLYAMIDE SUBSTRATE

[75] Inventors: Nobuaki Ito, Otsu; Akimitsu Tsukuda, Kyoto; Kazumasa Yoneyama, Otsu, all of Japan

[73] Assignee: Toray Industries, Inc., Japan

[21] Appl. No.: 527,269

[22] Filed: Sep. 12, 1995

[30] Foreign Application Priority Data

Sep. 14, 1994 [JP] Japan .................................. 6-219676

[51] Int. Cl.$^6$ .................................................. G11B 5/704
[52] U.S. Cl. ................ 428/141; 428/474.4; 428/694 SL; 428/694 SG; 428/900
[58] Field of Search ............................... 428/141, 474.4, 428/694 SL, 694 SG, 900

[56] References Cited

U.S. PATENT DOCUMENTS

| | | | |
|---|---|---|---|
| 4,112,187 | 9/1978 | Asakura et al. | 428/474 |
| 4,210,703 | 7/1980 | Scantlin et al. | 428/413 |
| 4,952,449 | 8/1990 | Okazaki et al. | 428/147 |
| 5,013,823 | 5/1991 | Mizuno et al. | 528/388 |
| 5,051,319 | 9/1991 | Kuse et al. | 428/694 |
| 5,143,983 | 9/1992 | Yamagishi et al. | 525/432 |

FOREIGN PATENT DOCUMENTS

| | | |
|---|---|---|
| 0090499 | 10/1983 | European Pat. Off. . |
| 0182287 | 5/1986 | European Pat. Off. . |
| 63-28695 | 2/1988 | Japan . |
| 64-22213 | 1/1989 | Japan . |
| 2-193618 | 7/1990 | Japan . |
| 5-64594 | 9/1993 | Japan . |

*Primary Examiner*—Stevan A. Resan
*Attorney, Agent, or Firm*—Austin R. Miller

[57] ABSTRACT

The present invention provides a magnetic recording medium including a base film having an aromatic polyamide and a magnetic layer formed on at least one surface of the base film, such that the base film has a tensile Young's modulus in at least one direction of not less than 700 kg/mm$^2$, a content of materials extractable with methylene chloride of not more than 0.5%, and a dimensional change in the longitudinal direction after applying a load of 1 kg per 1 mm$^2$ at 100° C. for 10 minutes of not more than 2%. The magnetic recording medium is excellent in running property and durability even under severe conditions.

2 Claims, No Drawings

MAGNETIC RECORDING MEDIUM HAVING AN AROMATIC POLYAMIDE SUBSTRATE

BACKGROUND OF THE INVENTION

1. Field of the Invention

The present invention relates to a magnetic recording medium, particularly, a magnetic recording medium having excellent durability and running property.

2. Description of the Related Art

Since aromatic polyamide films have excellent heat resistance and mechanical properties, they have been studied in various applications. As para-oriented aromatic polyamides have mechanical properties, such as stiffness and strength, which are better than those of other polymers, it has been proposed to use them in printer ribbons, magnetic tapes, capacitors and the like. Para-oriented aromatic polyamides are drawing particular attention as materials appropriate for base films of small video tapes and tapes for external memory of computers. In these applications, for example, video tapes are being used more often outdoors, so that magnetic tapes having excellent durability, which can be safely used even if the tapes encounter large fluctuations of temperature, are demanded. As for tapes used in external memory of computers, since they are often used under severe conditions, such as high temperatures and repeated runnings, and since reliability thereof is strongly demanded, a magnetic tape having excellent running property and durability is demanded.

An example of a known magnetic recording medium employing an aromatic polyamide film is described in Japanese Laid-Open Patent Application (Kokai) No. 58-168655, in which a ferromagnetic layer is formed on an aromatic polyamide film that contains not less than 50 mol % of para-aromatic amide units and has a tensile Young's modulus in at least one direction of not less than 500 kg/mm$^2$ in order to promote dimensional stability against external force, fluctuation of temperature and humidity. Japanese Laid-Open Patent Application (Kokai) No. 62-112218 discloses a magnetic tape in which a magnetic layer is formed on an aromatic polyamide film having a thickness of 3 μm to 8 μm, a tensile Young's modulus in the longitudinal direction of not less than 1300 kg/mm$^2$, an edge tearing strength in all directions of not less than 1 kgf, and a light transmittance at 600 nm of not less than 60% in order to reduce jitter, foldings and wrinkles of the tape. U.S. Pat. No. 4,645,702 discloses a magnetic recording medium in which a magnetic layer is formed on an aromatic polyamide film having a density of 1.400 to 1.490 (g/cm$^3$) and a product of the coefficient of thermal expansion and heat shrinkage factor of $1.0 \times 10^{-4}$ to $1.0 \times 10^{-7}$ (mm/mm/°C.) * (%), in order to promote flatness after forming the magnetic layer. Japanese Patent Publication (Kokoku) No. 55-9425 discloses a process for producing an aromatic polyamide film having substituent groups introduced into the aromatic polyamide, having an inherent viscosity of not less than 0.55, and having a content of ionic inorganic compounds of not more than 1000 ppm, for the purpose of reducing curl and promoting the heat resistance of the aromatic polyamide film. The ionic inorganic compounds herein mean compounds derived from lithium salts, calcium salts or the like employed as a solubilizer, and sulfuric acid or the like used as a solvent.

However, since magnetic recording media have recently acquired large capacities, are small and thin, and are more and more often used under severe conditions such as high temperatures, a magnetic recording medium having improved running property and durability over that obtained by the above-described prior art techniques is demanded. It is believed the demand will increase even further.

The present inventors looked for factors which control running property and durability, and discovered that running property and durability can be promoted by controlling the oozing of low molecular-weight impurities such as oligomers contained in the film, thereby achieving the present invention.

SUMMARY OF THE INVENTION

An object of the present invention is to overcome the above-mentioned problems and to provide a magnetic recording medium having excellent running property and durability even after extended use, exploiting the excellent heat resistance and high stiffness of aromatic polyamides.

That is, the present invention provides a magnetic recording medium comprising a base film consisting essentially of an aromatic polyamide and a magnetic layer formed on at least one surface of the base film, wherein the base film has a tensile Young's modulus in at least one direction of not less than about 700 kg/mm$^2$, a content of materials which are extractable with methylene chloride of not more than about 0.5%, and a dimensional change in the longitudinal direction after applying a load of 1 kg per 1 mm$^2$ at 100° C. for 10 minutes of not more than about 2%.

DESCRIPTION OF THE PREFERRED EMBODIMENTS

The aromatic polyamide used in the present invention contains the units expressed by the formula (I) and/or formula (II) preferably in an amount of not less than 50 mol %, more preferably not less than 70 mol %.

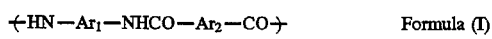   Formula (I)

   Formula (II)

wherein Ar$_1$, Ar$_2$ and Ar$_3$ represent, for example

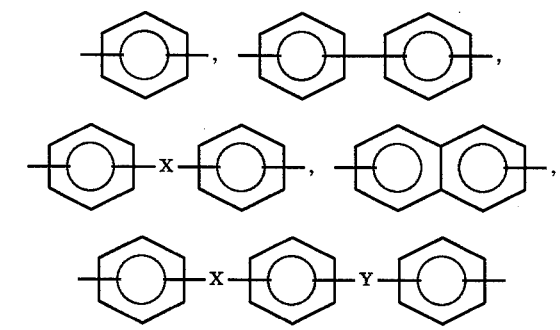

(wherein X and Y each represent —O—, —CH$_2$—, —CO—, —SO$_2$—, —S—, —C(CH$_3$)$_2$—and the like).

Ar$_1$, Ar$_2$ and Ar$_3$ are not restricted to those groups described above. The aromatic polyamides mentioned above where a part of the hydrogen atoms on the aromatic rings are substituted with a halogen such as fluorine, chlorine or bromine (especially chlorine); nitro group; alkyl group such as methyl, ethyl or propyl (especially methyl); alkoxy group such as methoxy, ethoxy, propoxy or isopropoxy (especially methoxy); and in which at least a part of the hydrogen atoms in the amide bonds in the polymer are substituted with a substituent, may also be employed in the present invention.

The aromatic polyamide preferably contains para-aromatic amide units in an amount of not less than about 50%, more preferably not less than about 70% because the stiffness and heat resistance of the films produced from such aromatic polyamides are good. To minimize moisture absorption, it is preferred that aromatic polyamide units in which a part of the hydrogen atoms on the aromatic ring are substituted with halogens (especially chlorine) be contained in an amount of not less than about 30% based on the total aromatic polyamide.

It is more preferred that the aromatic polyamide contains the unit of the formula:

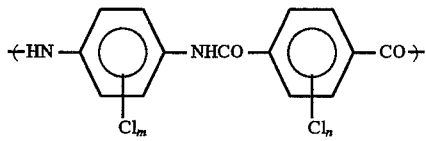

(wherein m and n independently represent an integer of 0 to 4) in an amount of not less than about 50 mol %, still more preferably not less than about 70 mol %.

The aromatic polyamide which may be used in the present invention contains the repeating unit represented by the above-described formula (I) and/or formula (II) in an amount of not less than about 50 mol %. The remaining less than about 50 mol % may be other repeating units (such as aromatic polyimide and the like) copolymerized or blended with the aromatic amide units. Further, additives such as electro-conductive particles, lubricants, anti-oxidants and the like may be contained in the aromatic polyamide in an amount not adversely affecting the physical properties of the film.

The base film of the magnetic recording medium according to the present invention has a tensile Young's modulus in at least one direction of not less than about 700 kg/mm², preferably not less than about 900 kg/mm², still more preferably not less than about 1200 kg/mm². If it is less than about 700 kg/mm², the stiffness of the magnetic tape is too small, so that the desired output cannot be attained, or the tape is deformed to the extent that the tape cannot be practically used.

In the magnetic recording medium according to the present invention, the amount of materials in the base film extractable with methylene chloride must be not more than about 0.5 wt %, preferably not more than about 0.2 wt %, still more preferably not more than about 0.1 wt %. If more than about 0.5 wt %, impurities such as oligomers emerge on the surface of the film from inner part of the film, which make the running property and the durability of the magnetic tape poor. It is thought that the running property and durability are deteriorated because the impurities are oozed on the surface of the magnetic layer or on the surface opposite to the magnetic layer.

It should be noted, however, if the amount of the materials in the base film extractable with methylene chloride is more than about 0.1 ppm, a lubricating effect may be obtained. Therefore, the amount of the methylene chloride-extractable materials in the base film is preferably not less than about 0.1 ppm, still more preferably not less than about 5 ppm.

In the magnetic recording medium according to the present invention, the dimensional change of the base film in the longitudinal direction after applying a load of 1 kg per 1 mm² at 100° C. for 10 minutes must be not more than about 2%, preferably not more than about 1.5%, still more preferably not more than about 1.0%. In response to the demand of making the magnetic recording medium thin, the magnetic recording medium according to the present invention will be used in the form of a thin film. Thus, if the dimensional change is more than about 2%, elongation and shrinkage of the tape are caused by tension, so that recording-reproducing properties are deteriorated. Further, because of the high dimensional stability of the base film, the dimensional change of the tape during the drying step after forming the coating layer is small. Thus, the high dimensional stability is also advantageous in processing the film.

To give appropriate surface roughness so as to stabilize the running property and durability of the magnetic recording medium according to the present invention, it is preferred that particles are added to the base film. Examples of the particles which may be added to the base film include inorganic particles such as particles of $SiO_2$, $TiO_2$, $Al_2O_3$, $CaSO_4$, $BaSO_4$, $CaCO_3$, carbon black, zeolite and metals; and organic particles such as silicone particles, polyimide particles, cross-linked copolymer particles, cross-linked polyester particles and Teflon particles. In view of heat resistance, inorganic particles are preferred. The diameter of the particles may preferably be about 0.01–1.0 µm, more preferably about 0.05–0.5 µm because the electro-magnetic conversion property and running property are good when such particles are added. The content of the particles may preferably be about 0.01–10 wt %, more preferably about 0.1–5 wt % because tape output properties and running property are good when the particle content is within these ranges.

The center-line mean roughness (hereinafter referred to as "Ra") of at least one surface of the base film of the magnetic recording medium according to the present invention is preferably about 0.1–100 nm, more preferably about 0.3–70 nm, still more preferably about 0.5–50 nm. If Ra is more than about 100 nm, output properties may be deteriorated. If Ra is less than about 0.1 nm, running property and durability may be deteriorated.

The center-line mean depth (hereinafter referred to as "Rp") of at least one surface of the base film is preferably about 2–500 nm, more preferably about 3–300 nm, still more preferably about 4–200 nm. If Rp is more than about 500 nm, output properties may be deteriorated. If Rp is less than about 2 nm, running property and durability may be deteriorated.

The ten-point mean roughness (hereinafter referred to as "Rz") of at least one surface of the base film is preferably about 2–500 nm, more preferably about 3–300 nm, still more preferably about 4–200 nm. If Rz is more than about 500 nm, output properties may be deteriorated. If Rz is less than about 2 nm, running property and durability may be deteriorated.

As long as the tensile Young's modulus of the base film in at least one direction is not less than about 700 kg/mm², base film of the magnetic recording medium according to the present invention may be more strengthened in the longitudinal direction, transverse direction or in a slant direction. Usually, the base film is more strengthened in the longitudinal or transverse direction. Although the degree of strengthening is not restricted, in view of the properties such as elongation and tear resistance, it is practical that tensile Young's modulus in the longitudinal direction $E_{MD}$ and tensile Young's modulus in the transverse direction $E_{TD}$ satisfy the following relationship.

$$\text{about } 0.5 \leq E_{MD}/E_{TD} \leq \text{about } 2$$

The thickness of the base film of the magnetic recording medium according to the present invention is preferably about 0.5–15 μm, more preferably about 1–8 μm, still more preferably about 2–5 μm because excellent running property and electro-magnetic conversion property, which result from the present invention, are obtained in a thin magnetic recording medium.

The elongation in at least one direction of the base film of the magnetic recording medium according to the present invention is preferably not less than about 10%, more preferably not less than about 20%, still more preferably not less than about 30% because such elongation ensures that the tape has good flexibility.

The moisture absorption of the base film of the magnetic recording medium according to the present invention is preferably not more than about 4%, more preferably not more than about 3%, still more preferably not more than about 2% because the dimensional change of the tape due to fluctuations in humidity will be limited so that good electro-magnetic conversion property may be maintained.

The magnetic recording medium according to the present invention comprises the above-described base film and a magnetic layer formed on at least one surface of the base film.

Methods for forming the magnetic layer include a wet method in which a magnetic coating composition prepared by mixing ferromagnetic powder with a binder is applied to the base film; and dry methods such as vapor-deposition, sputtering, ion-plating and the like. Although the method for forming the magnetic layer is not restricted, a wet method will now described as an example.

The type of the magnetic powder for forming the magnetic layer is not restricted, and ferromagnetic powder such as ferric oxide, chromium oxide, Fe, Ba—Fe, Co, Fe—Co, Fe—Co—Ni, Co—Ni, Co—Cr and the like may preferably be employed.

The magnetic powder can be formulated into a magnetic coating composition by mixing the powder with one or more binders. As the binder, thermosetting resin-based binders and radiant beam setting resin-based binders are preferred. Dispersing agents, lubricants and anti-static agents may also be used. For example, a binder comprising vinyl chloride/vinyl acetate/vinyl alcohol copolymers, polyurethane prepolymers and isocyanate may be used.

In the magnetic recording medium according to the present invention, in order to further promote running property, a back coat layer may be formed on the surface opposite to the surface on which the magnetic layer is formed.

A process for producing the magnetic recording medium according to the present invention will now be described. It should be noted, however, that the process for producing the magnetic recording medium is not restricted thereto.

In cases where the aromatic polyamide is prepared from an acid chloride and a diamine, the aromatic polyamide may be synthesized by solution polymerization in an aprotic organic polar solvent such as N-methylpyrrolidone (NMP), dimethylacetamide (DMAc) or dimethylformamide (DMF), or by interfacial polymerization in an aqueous medium. If an acid chloride and a diamine are used as monomers, hydrogen chloride is produced as a by-product. In cases where the generated hydrogen chloride is neutralized, an inorganic neutralizing agent such as calcium hydroxide, lithium hydroxide, calcium carbonate or lithium carbonate; or an organic neutralizing agent such as ethylene oxide, propylene oxide, ammonia, triethylamine, triethanolamine or diethanolamine may be used. The reaction between an isocyanate and carboxylic acid is carried out in an aprotic organic polar solvent in the presence of a catalyst.

The polymer solution may be used as the film-forming solution as it is. Alternatively, the polymer may be once separated from the solution and then dissolved again in the above-mentioned organic solvent or in an inorganic solvent such as sulfuric acid to form a film-forming solution.

To obtain an aromatic polyamide film according to the present invention, the inherent viscosity of the polymer (the value obtained by measuring the viscosity of a solution containing 0.5 g of the polymer in 100 ml of sulfuric acid at 30° C.) is preferably not less than about 0.5.

To the film-forming solution, as a solubilizer, an inorganic acid such as calcium chloride, magnesium chloride, lithium chloride, lithium nitrate or the like may be added. The concentration of the polymer in the film-forming solution is preferably about 2–40% by weight.

The particles may be added by thoroughly mixing particles with a solvent to form a slurry using the obtained slurry as a solvent for polymerization or for dilution; or the particles may be directly added to the film-forming solution after preparing the film-forming solution.

The film-forming solution prepared as described above is subjected to the so-called solution casting process so as to form a film. The solution casting process includes a dry/wet process, a dry process and a wet process. Although the film may be formed by any of these methods, the dry/wet process will now be described as an example.

In cases where the film is prepared by the dry/wet process, the film-forming solution is extruded through a die onto a support such as a drum or an endless belt made of nickel, stainless steel, copper, titanium, "Hastelloy," tantalum or the like to form a thin film. The thin film layer is then dried to evaporate the solvent until the thin film acquires self-supporting property. The drying may be carried out at about room temperature to 250° C. for not more than about 60 minutes, more preferably at about room temperature to 200° C. If the drying temperature is higher than about 250° C., voids may be formed and the surface may be roughened because of the rapid heating, so that a film which may be practically used as an industrial material or a magnetic material cannot be obtained.

The film after the above-mentioned dry process is peeled from the support and subjected to a wet process in which the solvent and impurities contained in the film are removed. The bath is usually an aqueous bath which may contain an organic solvent, inorganic salt or the like in addition to water. However, the bath usually contains water in an amount of not less than about 30%, more preferably not less than about 50%, and the bath temperature is usually about 0–100° C. Further, to decrease the impurities in the film, it is effective to raise the bath temperature to about 50° C. or higher, or to pass the film through an organic solvent bath in addition to the aqueous bath. As the organic solvent, halogenated hydrocarbons such as chloroform, methylene chloride, "Freon;" and other organic solvents such as alcohols, ketones and ethers may be employed. In the wet process, the film peeled off from the above-mentioned support is immersed under tension in the above-mentioned one or more baths, thereby extracting impurities such that the impurity content of the film is not more than about 0.5%, preferably not more than about 0.2%, still more preferably not more than about 0.1%.

The film after the wet process is then stretched, dried and heat set to prepare a final film.

The film is stretched during the film-forming process to obtain the mechanical characteristics within the ranges defined in the present invention. The area stretching ratio (the value obtained by dividing the area of the film after stretching by the area of the film before stretching; an area stretching ratio not more than 1 means relaxing) is preferably about 0.8–5.0, more preferably about 1.1–3.0. By annealing the film after heat set, dimensional change may be reduced. In this case, it is effective to anneal the film at a rate of not more than about 100° C./second.

Then a magnetic layer is coated on the film. Although the magnetic layer may be coated by any of the known methods, the method using a gravure roller is preferred in view of the uniformity of the coated layer. The drying temperature after coating is preferably about 80° C.–150° C. A calendar process may preferably be carried out at about 25° C. to 150° C.

Thereafter, to further promote the running property, a back coat layer may be formed on the surface of the base film opposite to the magnetic layer by a known method.

After curing the film coated with the magnetic layer, the film is slit to obtain the magnetic recording medium according to the present invention. The magnetic recording medium may be used, for example, as 8 mm tape for personal or professional use; as D-1, 2, 3 for broadcasting use; and DDS-2, 3, 4, QIC and Data-8 mm for data storage use, although the uses of the medium are not restricted thereto.

The methods used for measuring and evaluating characteristics relating to the present invention will now be described.

(1) tensile Young's modulus, Elongation and Strength

Tensile Young's modulus, elongation and strength were measured in accordance with ASTM D882-81 using an instron-type tensile tester. The width of the test sample was 10 mm, and a gauge length was 100 mm, and the stretching rate was 300 mm/minute.

(2) Dimensional Change

Label lines are drawn on the film at intervals of 150 mm. The film is then slit to a width of 10 mm to obtain a test sample. The thickness of the test sample is measured with a micrometer and a weight is attached to the sample such that the load is 1 kg/mm$^2$. Under these conditions, the sample is heated in an oven at 100° C. for 10 minutes and the dimensional change is calculated according to the following equation:

$$\text{Dimensional change (\%)} = \frac{|A - B|}{A} \times 100$$

(wherein A is the gauge length before heating and B is the gauge length after heating).

(3) Amount of Materials Extractable with Methylene Chloride

Minced film is supplied to a Soxhlet's extractor and purified methylene chloride is then added thereto. The mixture is then heated at the boiling point for 1 hour. After being transferred to a rotary evaporator and concentrated to a constant weight while adjusting the degree of vacuum, the weight of the residue is measured.

(4) Surface Roughness

The surface roughness was measured 5 times using a high precision film gap measuring instrument (ET-10, commercially available from Kosaka Kenkyujo) and the surface roughness is expressed in terms of the average of the measured values. The radius of the tip of the stylus was 0.5 μm, the load of the touching pin was 5 mg, the cutoff value was 0.08 mm, and the measured length was 0.5 mm.

(5) Running Property

A film having a coating layer is slit to a width of ½ inch and then made to run contacting a guide pin (Ra: 100 nm) using a tape running tester (running speed:100 m/minute, winding angle: 60°). Before the running test, the tape is aged at 60° C. and 80% RH for 48 hours. In the running test, the tape is made to run at 40° C., 80% RH such that the surface opposite to the magnetic layer contacts the guide pin. After 10 runs, change in the dynamic frictional coefficient was measured. Those wherein the change is not more than 10% are expressed in Table 1-2 by the symbol "⊚," those wherein the change is more than 10% and not more than 15% are expressed by the symbol "○," those wherein the change is more than 15% and not more than 20% are expressed by the symbol "△," and those wherein the change is more than 20% are expressed by the symbol "X."

(6) Durability

The running test as described above is performed 100 times on a tape, and the tape is observed after the test. Those showing no deformation at all are expressed in Table 1-2 by the symbol "○," those wherein slight and sporadic deformations of the tape are observed are expressed by the symbol "△," those wherein large deformation of the tape is observed throughout the entire tape are expressed by the symbol "X."

The present invention will now be described by way of examples. It should be noted, however, that the invention defined in the appended claims is not restricted to the examples below.

EXAMPLE 1

A slurry of silica particles was prepared by dispersing dry silica particles having a primary particle diameter of 0.02 μm so as to attain an average particle size of 0.2 μm in N-methyl-2-pyrrolidone (NMP).

NMP and the above-described silica slurry were placed in a polymerization vessel. In this mixture, as aromatic diamine components, 85 mol % of 2-chloroparaphenylenediamine and 15 mol % of 4,4'-diaminodiphenyl ether were dissolved, and then 99 mol % of 2-chloroterephthalic chloride based on the aromatic diamine components was added, followed by stirring for 2 hours to complete polymerization. Ninety seven mol % of the generated hydrogen chloride was neutralized with lithium hydroxide and 7 mol % of diethanolamine was added to obtain a polymer solution. The particle content was 2% by weight based on the aromatic polyamide. The polymer solution was adjusted to attain a polymer concentration of 11% by weight and a viscosity of 4000 poise at 30° C. to obtain a film-forming solution.

The film-forming solution was defoamed under a reduced pressure of 100 Torr in a screw extruder and the solution was passed through a filter having a cut size of 5 μm. The solution was then extruded through a die heated to 50° C. onto a metal belt. The cast film on the metal belt was heated with hot air at 150° C. for 2 minutes to evaporate the solvent and the resulting self-supporting film was continuously peeled off from the belt. The film was then introduced into a water bath at 60° C. having a concentration gradient of NMP to extract the remaining solvent and inorganic salts and the like produced by the neutralization. The extraction time was 5 minutes. The film was then immersed in a chloroform bath at 30° C. for 2 minutes. In these baths, the film was stretched in the longitudinal direction (MD) at a stretching ratio of 1.1 times the original length.

The film was then introduced into a tenter and heated at 280° C. for 1 minute to carry out drying and heat set. During this heating, the film was stretched in the transverse direction (TD) at a stretching ratio of 1.4 times the original length. The film was then annealed to 200° C. at a rate of 30°

C./second to obtain a film with a thickness of 4.5 µm. The characteristics of this film are shown in Tables 1-1 and 1-2.

A magnetic coating composition was prepared and coated on the surface which did not contact the metal belt during the film-forming process with a gravure roll to a prescribed thickness, followed by curing and calendering. The thickness of the magnetic layer was 2 µm, and the magnetic coating composition was comprised of the following components:

| | |
|---|---|
| Magnetic powder (metal powder) | 80 parts by weight |
| Vinyl chloride-based copolymer | 10 parts by weight |
| Polyurethane | 10 parts by weight |
| Curing agent | 5 parts by weight |
| Polishing agent | 5 parts by weight |
| Toluene | 100 parts by weight |
| Methyl ethyl ketone | 100 parts by weight. |

The resulting coated film was slit to obtain a magnetic tape. The running property and durability of this tape were evaluated and were excellent. The evaluations of the running property and durability of this magnetic tape are summarized in Table 1-2.

EXAMPLE 2

Polymerization and neutralization were carried out in the same manner as in Example 1 except that 95 mol % of 2-chloroparaphenylenediamine and 5 mol % of 4,4'-diaminodiphenyl ether were used as the aromatic diamine components. The polymer concentration was adjusted to 9% by weight and the viscosity of the solution at 30° C. was adjusted to 4000 poise to obtain a film-forming solution.

In the same manner as in Example 1, the film-forming solution was cast on a metal belt and the solvent was evaporated, followed by introducing the film into a water bath to extract the remaining solvent and inorganic salts and the like produced by the neutralization. The extraction time was 5 minutes. The film was then immersed in a chloroform bath at 30° C. for 1 minute. In these baths, the film was stretched in the longitudinal direction (MD) at a stretching ratio of 1.4 times the original length.

The film was then introduced into a tenter and heated at 280° C. for 1 minute to carry out drying and heat set. During this heating, the film was stretched in the transverse direction at a stretching ratio of 1.2 times the original length. The film was then annealed to 150° C. at a rate of 50° C./second to obtain a film with a thickness of 4.5 µm. The characteristics of this film are shown in Tables 1-1 and 1-2.

A magnetic layer having a thickness of 2 µm was formed in the same manner as in Example 1 and a back coat layer having a thickness of 0.5 µm was formed on the surface opposite to the magnetic layer. The coating composition for forming the back coat layer had the following composition:

| | |
|---|---|
| Carbon black | 100 parts by weight |
| Vinyl chloride-based copolymer | 20 parts by weight |
| Polyurethane | 50 parts by weight |
| Toluene | 200 parts by weight |
| Methyl ethyl ketone | 400 parts by weight. |

The resulting coated film was slit to obtain a magnetic tape. The running property and durability of this tape were evaluated and were excellent. The evaluations of the running property and durability of this magnetic tape are summarized in Table 1-2.

EXAMPLE 3

In this example, a metal evaporated tape was prepared using a polymer having the same structure as in Example 1. In the solution of the aromatic diamine in NMP, spherical silica particles having a diameter of 50 nm were dispersed such that the content was 0.5% by weight based on the polymer. To this mixture, 2-chloroterephthalic chloride was added as in Example 1 to complete the polymerization, and then neutralization was carried out. The polymer concentration was adjusted to 11% by weight and the viscosity of the solution at 30° C. was adjusted to 5000 poise.

The thus obtained film-forming solution was passed through a filter having a cut size of 1 µm and extruded through a die onto a metal belt. After heating the cast film with hot air having a temperature of 180° C. for 50 seconds to evaporate the solvent, the film was then continuously peeled off from the belt, and introduced into a water bath at 40° C. The immersion time was 3 minutes. The film was then immersed in methylene chloride bath at 30° C. for 2 minutes. In these baths, the film was stretched in the longitudinal direction (MD) at a stretching ratio of 1.2 times the original length.

The film was then introduced into a tenter and heated at 300° C. for 1 minute to carry out drying and heat set. During this heating, the film was stretched in the transverse direction (TD) at a stretching ratio of 1.3 times the original length. The film was then annealed to 150° C. at a rate of 50° C./second to obtain a film with a thickness of 3.5 µm. The characteristics of this film are shown in Tables 1-1 and 1-2.

The film was then mounted in a vacuum chamber and treated with glow discharge under argon atmosphere of $10^{-2}$ Torr. The vacuum chamber was then evacuated to $10^5$ Torr, and the film was made to run along a drum at 20° C. While running the tape, Co-Ni alloy (Co: 80 wt %, Ni: 20 wt %) was heated with an electron beam to form a magnetic layer having a thickness of 150 nm on the film. A back coat layer was then formed as in Example 2 to obtain a magnetic tape.

The resulting coated film was slit to obtain a magnetic tape. The running property and durability of this tape were evaluated and were excellent. The characteristics of the film and evaluations of the running property and durability of this magnetic tape are shown in Tables 1-1 and 1-2.

EXAMPLE 4

Using the film-forming solution prepared in Example 3, a film having a thickness of 3.5 µm was prepared. The film was prepared in the same manner as in Example 3 except that a "Freon" bath at 20° C. was used in place of the methylene chloride bath and the immersion time therein was 1 minute. On this film, a magnetic layer and a back coat layer were formed as in Example 3. The running property and durability of the obtained magnetic tape were evaluated and were excellent. The characteristics of the film and evaluations of the running property and durability of this magnetic tape are shown in Tables 1-1 and 1-2.

EXAMPLE 5

A film having a thickness of 4.5 µm was prepared in the same manner as in Example 1, except that a methanol bath at 10° C. was employed in place of the chloroform bath at 30° C., immersion time therein was 60 seconds, and that the stretching ratios in MD and TD were 1.2 times and 1.3 times the original length, respectively. A magnetic layer and a back coat layer were formed in the same manner as in Example 2. The running property and durability of the obtained magnetic tape were evaluated and were excellent. The characteristics of the film and evaluations of the running property and durability of this magnetic tape are shown in Tables 1-1 and 1-2.

EXAMPLE 6

A film having a thickness of 4.5 μm was prepared in the same manner as in Example 1, except that a methanol bath at 10° C. was employed in place of the chloroform bath at 30° C., immersion time therein was 30 seconds, and that the stretching ratios in MD and TD were 1.2 times and 1.3 times the original length, respectively. A magnetic layer and a back coat layer were formed in the same manner as in Example 2. The running property and durability of the obtained magnetic tape were evaluated and were good. The characteristics of the film and evaluations of the running property and durability of this magnetic tape are shown in Tables 1-1 and 1-2.

EXAMPLE 7

A film having a thickness of 2.3 μm was prepared in the same manner as in Example 1, except that the film was immersed in a water bath at 60° C. having a concentration gradient of NMP for 15 minutes and then in a chloroform bath at 30° C. for 10 minutes, and that the stretching ratios in MD and TD were 1.2 times and 1.3 times the original length, respectively. A magnetic layer and a back coat layer were formed on this film in the same manner as in Example 2. The running property and durability of the obtained magnetic tape were evaluated and were good. The characteristics of the film and evaluations of the running property and durability of this magnetic tape are shown in Tables 1-1 and 1-2.

EXAMPLE 8

In this example, a metallized tape was prepared using the polymer having the same structure as in Example 1. In the solution of the aromatic diamine in NMP, spherical silica particles having a diameter of 10 nm were dispersed to a content of 0.01% by weight based on the polymer. To this mixture, 2-chloroterephthalic chloride was added as in Example 1 to complete the polymerization, and then the neutralization was carried out. The polymer concentration was adjusted to 11% by weight and the viscosity of the solution at 30° C. was adjusted to 4200 poise.

A film having a thickness of 4.5 μm was prepared in the same manner as in Example 1 except that a filter having a cut size of 1 μm was used in place of the filter having a cut size of 5 μm, and that the stretching ratios in MD and TD were 1.2 and 1.3 times the original length, respectively. A magnetic layer and a back coat layer were formed on this film in the same manner as in Example 2. The running property and durability of the obtained magnetic tape were evaluated and were good. The characteristics of the film and evaluations of the running property and durability of this magnetic tape are shown in Tables 1-1 and 1-2.

EXAMPLE 9

A film having a thickness of 4.5 μm was prepared in the same manner as in Example 1, except that the stretching ratios in both MD and TD were 1.0 times the original length. A magnetic layer and a back coat layer were formed on this film in the same manner as in Example 2. The running property and durability of the obtained magnetic tape were evaluated and were good. The characteristics of the film and evaluations of the running property and durability of this magnetic tape are shown in Tables 1-1 and 1-2.

EXAMPLE 10

A film having a thickness of 7.5 μm was prepared in the same manner as in Example 1, except that the stretching ratios in MD and TD were 1.2 times and 1.3 times the original length, respectively. A magnetic layer and a back coat layer were formed on this film in the same manner as in Example 2. The running property and durability of the obtained magnetic tape were evaluated and were excellent. The characteristics of the film and evaluations of the running property and durability of this magnetic tape are shown in Tables 1-1 and 1-2.

Comparative Example 1

Using the same film-forming solution as in Example 1, a film was formed employing the same dry process as in Example 1. In the wet process, however, the film was immersed in a water bath at 0° C. for 1 minute and the chloroform bath was not used. As shown in Table 1-1, the amount of the materials extracted with methylene chloride. was large. The running property and durability were found to be poor. The film characteristics and evaluations of running property and durability are shown in Tables 1-1 and 1-2.

Comparative Example 2

A film having a thickness of 4.5 μm was prepared as in Example 1, except that the film was not immersed in the water bath having a NMP concentration gradient, but immersed only in the chloroform bath at 30° C. for 30 seconds, and that the stretching ratios in MD and TD were 1.2 times and 1.3 times the original length, respectively. A magnetic layer and a back coat layer were formed on this film in the same manner as in Example 2. The running property and durability of the obtained magnetic tape were found to be poor. The film characteristics and evaluations of running property and durability are shown in Tables 1-1 and 1-2.

Comparative Example 3

A film having a thickness of 4.5 μm was prepared as in Example 1, except that the heat set temperature in the tenter was 200° C. and the annealing in the tenter was not carried out. A magnetic layer and a back coat layer were formed on this film in the same manner as in Example 2. The running property and durability of the obtained magnetic tape were found to be poor. The film characteristics and evaluations of running property and durability are shown in Tables 1-1 and 1-2.

Comparative Example 4

A film having a thickness of 4.5 μm was prepared as in Example 1, except that 2-chloroparaphenylenediamine was used as the aromatic diamine component, 99 mol % of isophthalic chloride was used as the acid component and that the stretching ratios in MD and TD were 1.2 times and 1.3 times the original length, respectively. The tensile Young's modulus of this film was, at maximum, 650 kg/mm$^2$ in MD, 600 kg/mm$^2$ in TD, and 660 kg/mm$^2$ in the direction shifted clockwise from MD by 30°. A magnetic layer and a back coat layer were formed on this film in the same manner as in Example 2. The running property and durability of the obtained magnetic tape were found to be poor. The film characteristics and evaluations of running property and durability are shown in Tables 1-1 and 1-2.

Comparative Example 5

In a polymerization vessel, NMP and the silica slurry as used in Example 1 were mixed. In this mixture, as aromatic diamine component, 100 mol % of 4,4'-diaminodiphenyl ether was dissolved, and then pyromellitic dianhydride in an amount of 99 mol % based on the aromatic diamine component was added, followed by stirring for 2 hours to complete polymerization, thereby obtaining a polymer solution. The content of the particles was 2% by weight of the aromatic polyamide. The polymer solution was adjusted to attain a polymer concentration of 15% by weight and a viscosity of 4000 poise at 30° C. to obtain a film-forming solution.

The film-forming solution was defoamed under a reduced pressure of 100 Torr in a screw extruder and the solution was passed through a filter having a cut size of 5 μm. The solution was then extruded through a die heated to 50° C. onto a metal belt. The cast film on the metal belt was heated with hot air at 150° C. for 2 minutes to evaporate the solvent, and the resulting self-supporting film was continuously peeled off from the belt. The thus obtained self-supporting film was then introduced into a tenter and heated at 350° C. for 1 minute to carry out evaporation of the remaining solvent and heat set. During this heating, the film was stretched in MD at a stretching ratio of 1.2 times the original length and in TD at a stretching ratio of 1.3 times the original length. The film was then annealed to 200° C. at a rate of 30° C./second to obtain a film with a thickness of 12.0 μm. The tensile Young's modulus of this film was, at maximum, 310 kg/mm$^2$ in MD, 320 kg/mm$^2$ in TD, and 340 kg/mm$^2$ in the direction shifted clockwise from MD by 30°. A magnetic layer and a back coat layer were formed on this film in the same manner as in Example 2. The running property and durability of the obtained magnetic tape were found to be poor. The film characteristics and evaluations of running property and durability are shown in Tables 1-1 and 1-2.

Although this invention has been described in connection with specific forms thereof, it will be appreciated that a wide variety of equivalents may be substituted for the specific elements described herein without departing from the spirit and scope of the invention as defined in the appended claims.

TABLE 1-1

|  | Film Thickness (μm) | Amount of Extracted Materials (%) | Ra (nm) | Rp (nm) | Rz (nm) | Dimensional Change (%) MD | Dimensional Change (%) TD | Young's Modulus (kg/mm$^2$) MD | Young's Modulus (kg/mm$^2$) TD |
|---|---|---|---|---|---|---|---|---|---|
| Example 1 | 4.5 | 0.02 | 7 | 41 | 56 | 0.9 | 0.2 | 1100 | 1600 |
| Example 2 | 4.5 | 0.05 | 7 | 45 | 58 | 0.1 | 0.6 | 1800 | 1200 |
| Example 3 | 3.5 | 0.001 | 1 | 7 | 8 | 0.3 | 0.3 | 1450 | 1450 |
| Example 4 | 3.5 | 0.1 | 1 | 9 | 10 | 0.3 | 0.3 | 1450 | 1450 |
| Example 5 | 4.5 | 0.18 | 8 | 45 | 60 | 0.9 | 0.3 | 1100 | 1600 |
| Example 6 | 4.5 | 0.4 | 8 | 45 | 55 | 0.4 | 0.4 | 1450 | 1420 |
| Example 7 | 2.3 | NIL | 6 | 37 | 48 | 0.6 | 0.5 | 1480 | 1460 |
| Example 8 | 4.5 | 0.02 | 0.5 | 1.7 | 2.5 | 0.5 | 0.4 | 1430 | 1450 |
| Example 9 | 4.5 | 0.02 | 7 | 42 | 55 | 1.4 | 1.5 | 920 | 860 |
| Example 10 | 7.5 | 0.1 | 8 | 43 | 60 | 0.3 | 0.4 | 1400 | 1390 |
| Comparative Example 1 | 4.5 | 0.7 | 7 | 44 | 60 | 1.0 | 0.2 | 1100 | 1550 |
| Comparative Example 2 | 4.5 | 0.8 | 9 | 45 | 60 | 0.6 | 0.7 | 1430 | 1440 |
| Comparative Example 3 | 4.8 | 0.07 | 8 | 41 | 55 | 2.3 | 1.2 | 640 | 920 |
| Comparative Example 4 | 4.5 | 0.04 | 6 | 38 | 50 | 2.7 | 2.6 | 650 | 600 |
| Comparative Example 5 | 12 | 1.2 | 10 | 50 | 65 | 0.2 | 0.2 | 310 | 320 |

TABLE 1-2

|  | Strength (kg/mm$^2$) MD | Strength (kg/mm$^2$) TD | Elongation (%) MD | Elongation (%) TD | Moisture Absorption (%) | Running Property | Durability |
|---|---|---|---|---|---|---|---|
| Example 1 | 52 | 70 | 50 | 43 | 1.5 | ◉ | ○ |
| Example 2 | 72 | 55 | 35 | 43 | 1.2 | ◉ | ○ |
| Example 3 | 64 | 63 | 40 | 41 | 1.5 | ◉ | ○ |
| Example 4 | 63 | 63 | 43 | 41 | 1.5 | ◉ | ○ |
| Example 5 | 51 | 69 | 48 | 42 | 1.6 | ○ | ○ |
| Example 6 | 61 | 60 | 39 | 38 | 1.6 | △ | ○ |
| Example 7 | 66 | 64 | 44 | 45 | 1.7 | ○ | △ |
| Example 8 | 64 | 63 | 40 | 41 | 1.5 | △ | ○ |
| Example 9 | 37 | 36 | 55 | 53 | 1.8 | ○ | △ |
| Example 10 | 61 | 61 | 42 | 43 | 1.6 | ◉ | ○ |
| Comparative Example 1 | 50 | 69 | 52 | 43 | 1.5 | × | × |
| Comparative Example 2 | 59 | 58 | 39 | 38 | 2.1 | × | × |

TABLE 1-2-continued

|  | Strength (kg/mm²) | | Elongation (%) | | Moisture Absorption | Running | |
|---|---|---|---|---|---|---|---|
|  | MD | TD | MD | TD | (%) | Property | Durability |
| Comparative Example 3 | 34 | 41 | 50 | 44 | 2.5 | × | × |
| Comparative Example 4 | 44 | 43 | 75 | 75 | 2.8 | × | × |
| Comparative Example 5 | 30 | 29 | 75 | 70 | 2.6 | × | × |

What is claimed is:

1. A magnetic recording medium, comprising:

a base film consisting essentially of an aromatic polyamide, said base film having opposing surfaces and a longitudinal direction, and a magnetic layer formed on at least one of said opposing surfaces;

said base film being characterized by:
  (a) a tensile Young's modulus of about 700 kg/mm² or more in at least one direction,
  (b) a dimensional change of about 2% or less when a load of 1 kg/mm² is applied at 100° C. for 10 minutes in said longitudinal direction of said base film, and
  (c) materials extractable with methylene chloride in an amount of no less than about 0.1 ppm and no greater than about 0.5 wt %.

2. A magnetic recording medium according to claim 1, wherein at least one of said opposing surfaces of said base film further comprises a center-line mean depth of about 2 nm to 500 nm, a center-line mean surface roughness of about 0.1 nm to 100 nm, and a ten-point mean roughness of about 2 nm to 500 nm.

* * * * *